July 31, 1945.  E. A. KOETHER  2,380,767
PISTON RING
Filed Jan. 31, 1941  3 Sheets-Sheet 1
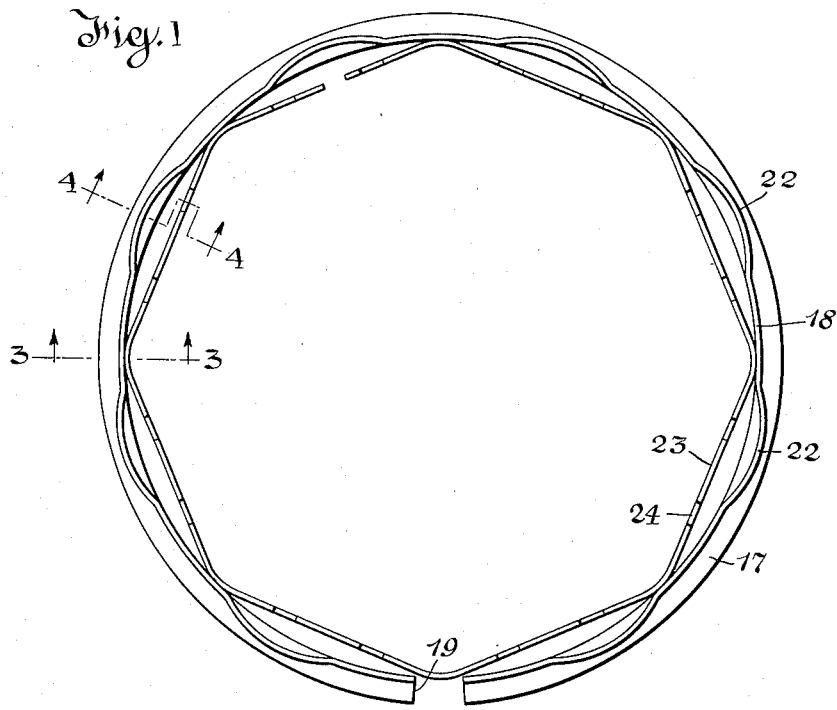
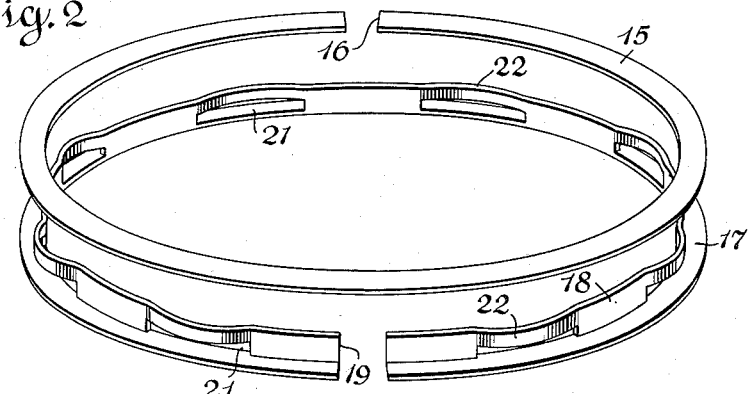
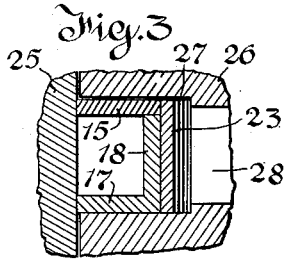 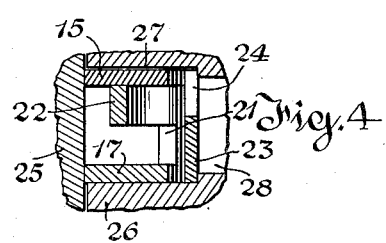
Inventor
Emil A. Koether
Attorneys July 31, 1945.  E. A. KOETHER  2,380,767
PISTON RING
Filed Jan. 31, 1941  3 Sheets-Sheet 2

Inventor
Emil A. Koether
Attorneys

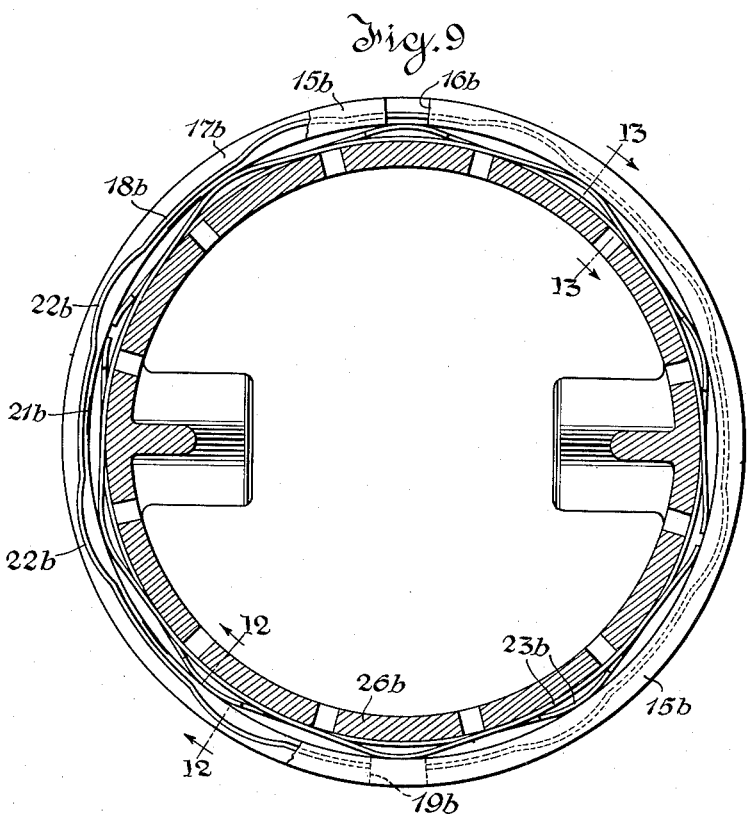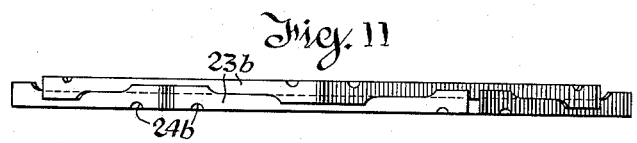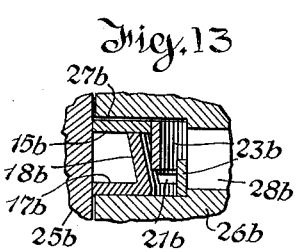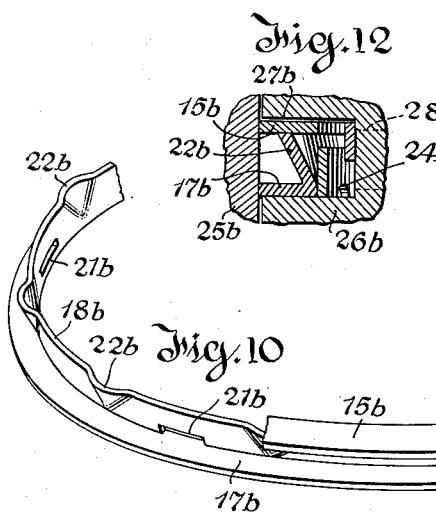

Patented July 31, 1945

2,380,767

UNITED STATES PATENT OFFICE 2,380,767

PISTON RING

Emil A. Koether, Baltimore, Md., assignor, by mesne assignments, to Koppers Company, Inc., a corporation of Delaware Application January 31, 1941, Serial No. 376,884

2 Claims. (Cl. 309—44)

This invention relates to piston rings and particularly to oil control rings chiefly intended for use in the lower grooves of trunk type pistons for internal combustion engines. Such grooves have oil drainage ports and the purpose of the invention is to produce a strong and durable ring suited for use even in narrow ring grooves and even in small diameter cylinders, yet having two oil scraping edges associated with ample clearance for oil drainage.

In salvaging old engines having worn pistons and cylinders, where the value of the engine fails to justify reboring cylinders and equipping them with new pistons, a prime effort is to stop "oil pumping." This can be done by applying oil control rings which are thin as measured in the direction of the piston axis and which develop substantial expansive force when closed to cylinder diameter, so that high unit pressures between ring and cylinder are had. The problem is to secure adequate strength and expansive force, and still assure free drainage of scraped oil. Low cost is an important consideration.

To accomplish the desired results the invention makes use of two spring steel split rings, each thin when measured in the direction of the piston axis and each of substantial radial dimension to afford the desired expansive tendency. The two rings are of substantially the same radial dimensions but one has, at or near its internal margin, either a cylindrical or an outward flaring conical flange that extends toward and engages the other ring. The flange is ported or otherwise formed to pass oil and is so dimensioned that the two rings, when assembled, fill the ring groove except for the usual side clearance. The intervening space afforded by the flange, together with the ports in the flange, offers a large capacity oil draining path.

It is important to increase the radial limits of contact between the unflanged ring and the flange of the flanged ring, so that the unflanged ring will be supported not merely at its inner margin, but will be sustained nearly to its outer margin at least at closely spaced points around the ring. In this way the tilting tendency of each ring may be resisted. The preferred arrangement is to slot or slit the flange and bend out fingers or bows, in which event oil ports are incidentally formed.

The rings are preferably formed of spring steel and develop inherent expansive force. However, the use of expanders is desirable. It is possible to use a single expander which extends approximately the full width of the groove and, underlying both rings, reacts outward on both. In some cases, for example where the flange is conical, two expanders can be used, each individually reacting only upon a corresponding one of the rings.

All the features above suggested are disclosed in the four practical embodiments of the ring which will now be described by reference to the accompanying drawings, in which:

Fig. 1 is a face view of the flanged side of the flanged ring with the expander set within the ring.

Fig. 2 is a perspective view of the flanged and unflanged rings slightly separated.

Fig. 3 is an enlarged section through a ring groove of a piston in a cylinder showing the improved ring in place. The plane of section is indicated by the line 3—3 on Fig. 1.

Fig. 4 is a view similar to Fig. 3 but in a plane of section indicated by the line 4—4 on Fig. 1.

Figure 5:
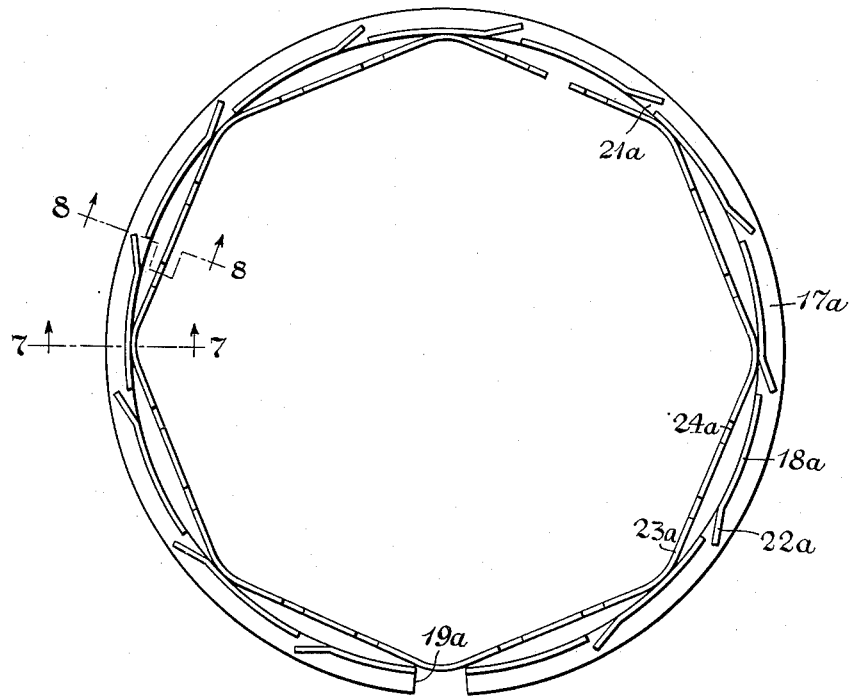
Fig. 5 is a view similar to Fig. 1 showing a modification.
Figures 7, 8:
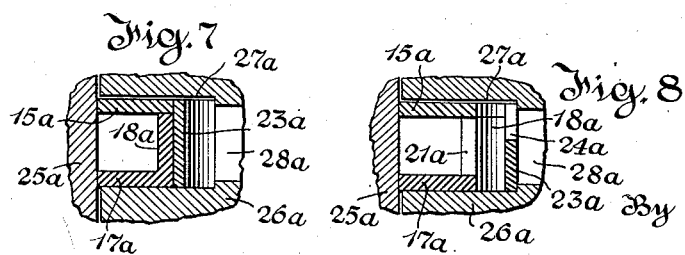

Figs. 7 and 8 are views similar to Figs. 3 and 4, the planes of section being indicated by the lines 7—7 and 8—8 in Fig. 5.

Fig. 9 is a transverse section through a piston showing a further modified form of ring in place with a duplex expander.

Fig. 10 is a fragmentary perspective of the two ring components.

Fig. 11 is an elevation of a duplex expander.

Figs. 12 and 13 are sections on the line 12—12 and 13—13 of Fig. 9.

In all forms the rings and expanders are preferably formed of spring steel. For special purposes other metals, such for example as bronze, may be used for ring components. All parts are produced by mechanical working (for example, rolling or drawing) as contradistinguished from casting.

In the drawings the unflanged component of the ring is shown as mounted on top, that is toward the working space, of the cylinder, and the flanged component is shown as mounted away from the working space with its flange projecting toward the working space. The two components are always assembled as shown relatively to each other, but either one may be positioned toward the working space without materially affecting the performance of the ring.

Embodiment of Figs. 1 to 4

The plain or flat ring 15 is thin as measured in an axial direction and quite deep in a radial direction. Typical axial and radial dimensions for a 3.5" diameter ring are respectively approximately 0.018" and 0.120". These dimensions are typical and not limiting even for a ring of that particular size. The ring is split at 16 and may be of such contour that when closed to a true circle it reacts outward practically uniformly around its circumference.

The flanged ring has a main or flat portion 17 and a flange 18 at its inner margin. There is a gap 19. The dimensions of portion 17 approximate those of ring 15. The height of the flange depends on the width of the ring groove.

The flange 18 is slotted at intervals, as indicated at 21, and adjacent each slot the metal of the flange is stretched outward to form bows 22, which increase the interval between the radial limits of contact between the flange and the plain or flat ring.

A polygonal split expander 23 with edge notches 24 to pass oil (see Fig. 1) is mounted in the ring groove as shown in Figs. 3 and 4. This is typical of any suitable known expander.

In Figs. 3 and 4 25 represents the cylinder wall and 26 the piston, 27 the ring groove and 28 an oil drainage port.

In Figs. 1-4 the slots 21 are shown as of considerable width. They need not be much wider than slits but it is convenient to make them so because they serve as large capacity oil ports and thus make it unnecessary to form any other ports. The embodiments of Figs. 5-8 differ chiefly in this detail.

Embodiments of Figs. 5-8 inclusive

In Figs. 5 to 8, parts which are functionally similar to parts shown in Figs. 1 to 4 are given the same number with distinguishing letters.

Referring to Fig. 5 it will be observed that instead of forming slots 21 and stretching the adjacent metal to produce bows 22, the flange 18a is slitted transversely at intervals around its circumference, and from each slit there is an extension which follows the junction of the flange 18a with the ring 17a. The effect is to free fingers 22a which are bent outwardly, leaving intervals 21a which serve as oil ports. This produces a plurality of outwardly bent fingers 22a which are in contact with and hence directly supported by the ring 17a.

Figure 6:
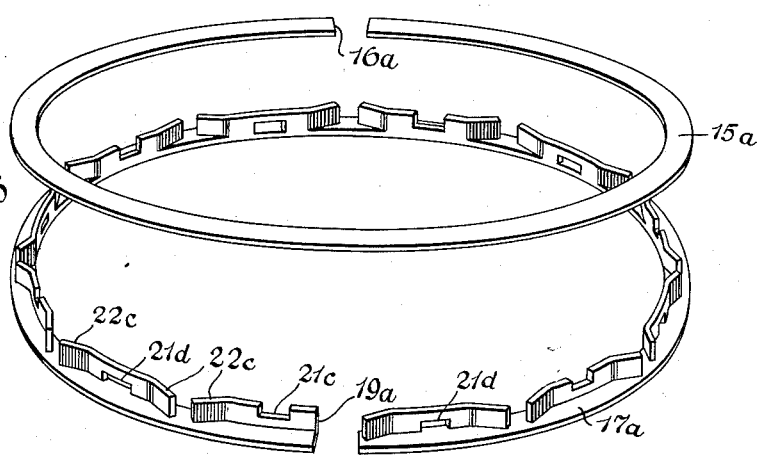
Fig. 6 is a perspective view similar to Fig. 2 showing a variant of the modification illustrated in Fig. 5.

A variant of this same idea is shown in Fig. 6 in which there are two sets of outwardly bent fingers 22c, the fingers of the two sets extending in opposite directions around the circumference of the ring. While the intervals between the fingers 22c provide adequate oil porting in most cases, additional oil porting is suggested in Fig. 6 and may be provided by the use of notches 21c or slot ports 21d, or both.

The particular location of the notches and slots is largely a matter of choice, the purpose of illustrating them in Fig. 6 being to indicate possibilities which may be availed of where additional porting is desired.

The form of Fig. 5 and the form of Fig. 6 have in common the idea of outwardly bent fingers which engage the ring 17a and which increase the radial extent of engagement between the flanged component 17a and the flat component 15a. (See Figs. 6, 7 and 8.) It is probably unnecessary to state that with the form shown in Fig. 5 and with the form shown in Fig. 6 a flat ring 15a is assembled as indicated in Figs. 7 and 8.

Embodiments of Figs. 9-13

In these figures parts similar to parts in Figs. 1-4 are similarly numbered with the distinguishing letter b.

Ring 15b is identical with ring 15. The other ring differs first in the form of flange 18b which is at an acute angle to the main portion 17b. Thus the flange is conical and flares outward. To extend the outer radial limit of engagement, recourse is had to lobes 22b, best shown in Fig. 10, which are produced without the use of slits or slots. Separate oil ports 21b are formed as shown. This embodiment makes clear the fact that the oil ports are not necessarily associated with the fingers or bows of the preceding figures.

A two-piece expander 23b is used. These expander elements may have oil drain notches 24b. Their proximate edges are serrated and the bends in the two expanders are staggered, permitting extra width at the bends as shown (see Fig. 11). However, this is only one form of multiple piece expander which may be used to advantage with this type of ring. Each expander reacts only upon a corresponding ring, permitting accommodation to wear of individual rings. Such selective action of the expanders is possible because the flare of flange 18b keeps the expander from engaging the flange.

General discussion of all forms

Four embodiments of the main inventive concept have been shown and others are possible. These examples are illustrative and not in any sense limiting. While the invention is primarily intended for use in internal combustion engines, it may be used in compressors, notably refrigerator compressors, and in any other installation where oil control rings are advantageous.

I claim:

1. An oil control piston-ring assembly for use in piston ring grooves, said assembly comprising a split ring thin in axial dimension and of comparatively large radial dimension; and a split ring with a cylinder contacting portion of similar axial and radial dimensions having an integral flange at its inner margin continuous except for said split and extending toward and engaging the proximate face of the first-named ring to space the rings and to fix the over-all axial dimension of the assembly while leaving the two rings free to expand and contract independently of one another, said flange having spaced outwardly deflected portions at the area of such engagement, the thickness of said flange approximating the thickness of the cylinder contacting portion upon which it is formed.

2. An oil control piston-ring assembly for use in piston ring grooves having oil drainage ports, said assembly comprising a split ring thin in axial dimension and of comparatively large radial dimension; a split ring having a cylinder contacting portion of similar axial and radial dimensions and having at its inner margin a ported flange of a thickness approximating said axial dimension, the flange being continuous except for said split and extending toward and engaging the proximate face of the first-named ring to space the rings and fix the overall axial dimension of the assembly, the edge of said flange having deflected portions serving to increase the radial range of engagement, while leaving the two rings free to expand and contract independently of one another; and yeilding means for expanding said rings.

EMIL A. KOETHER.